(12) United States Patent
Buyny

(10) Patent No.: US 7,592,072 B2
(45) Date of Patent: Sep. 22, 2009

(54) BISMALEIMIDE PREPREG SYSTEMS

(75) Inventor: Robert A. Buyny, Dublin, CA (US)

(73) Assignee: Hexcel Corporation, Dublin, CA (US)

( * ) Notice: Subject to any disclaimer, the term of this patent is extended or adjusted under 35 U.S.C. 154(b) by 457 days.

(21) Appl. No.: 11/300,135

(22) Filed: Dec. 14, 2005

(65) Prior Publication Data

US 2007/0134480 A1 Jun. 14, 2007

(51) Int. Cl.
| C08L 79/08 | (2006.01) |
| C08K 3/40 | (2006.01) |
| B32B 5/26 | (2006.01) |
| B32B 5/28 | (2006.01) |
| B32B 27/04 | (2006.01) |
| B32B 27/18 | (2006.01) |

(52) U.S. Cl. ............... 428/473.5; 428/113; 428/114; 428/338; 428/408; 428/902; 525/426; 525/436

(58) Field of Classification Search .......... 428/113, 428/114, 338, 408, 902, 473.5; 525/426, 525/436

See application file for complete search history.

(56) References Cited

U.S. PATENT DOCUMENTS

| 4,100,140 A | 7/1978 | Zahir et al. |
| 5,023,310 A | 6/1991 | Boyd |
| 5,037,689 A | 8/1991 | Boyd |
| 5,095,074 A | 3/1992 | Chu et al. |
| 5,120,823 A | 6/1992 | Boyd |
| 5,189,116 A | 2/1993 | Boyd et al. |
| 5,248,711 A | 9/1993 | Buyny et al. |

*Primary Examiner*—Ana L Woodward
(74) *Attorney, Agent, or Firm*—W. Mark Bielawski; David J. Oldenkamp

(57) ABSTRACT

Prepreg composite materials that include a fiber layer and a prepreg resin composed of a bismaleimide resin component, a thermoplastic toughening agent and a resin distribution stabilizer. The bismaleimide component is an amorphous mixture of at least three different bismaleimide monomers and a co-curing agent. The prepreg is useful in panel construction where a honeycomb core is sandwiched between two sheets of composite material.

18 Claims, 2 Drawing Sheets

BISMALEIMIDE PREPREG SYSTEMS

BACKGROUND OF THE INVENTION

1. Field of the Invention

The present invention relates generally to prepreg systems that utilize bismaleimide resins as a principal ingredient. More particularly, the present invention is directed to improving the storage stability, handling characteristics and curability of such prepreg systems.

2. Description of Related Art

Composite materials are used extensively in the aerospace industry and in other situations where high strength and light weight are desired. Composites typically include fibers and polymer resin as the two principal elements. A wide range of fiber types has been used in composites. Glass, graphite, carbon and ceramic fiber are common. The fibers can be chopped, randomly oriented, unidirectional in orientation or woven into fabric. The fibers used in composite materials have diameters that range from extremely small to relatively large. Although it is possible to make composites using large diameter fibers, the more common practice is to take thousands of fibers having extremely small diameters and form them into individual bundles known as tows. These multi-fiber tows are much stronger and more flexible than single fibers having the same overall diameter. The tows can be woven into fabric in the same manner a conventional yarns. Alternatively, the tows are arranged in parallel to provide a unidirectional fiber orientation or they can be randomly oriented.

Thermosetting resins have been widely used as the resin matrix in composite materials due to their high strength and high temperature capabilities. Bismaleimide resins have been a particularly popular thermosetting resins for aerospace applications due to their high glass transition temperature, their ability to withstand hot/wet environments and their low smoke and toxicant emissions during combustion. An initial problem with composites that utilized bismaleimide resins was that they were relatively brittle and had low damage tolerance. As a result, thermoplastic materials were incorporated into the bismaleimide resin matrix to provide a "toughened" resin. For examples of toughened bismaleimide resins, see U.S. Pat. Nos. 5,248,711 and 5,037,689.

There are a number of ways to combine the resin with the fibers to form the final composite material. One approach, which has been in use for years, is to manually impregnate the fibers with activated resin in-situ on a mold or other support structure. Heat is then used to cure resulting "lay-up". This type of manual lay-up procedure is popular because it is simple and requires little, if any special tools. However, it is difficult to accurately control the amount of resin that is applied to the fibers and to insure that the resin is being uniformly impregnated into the fiber tows. In addition, the amounts of curing agent and other additives that are added to the resin may vary between lay-ups. As a result, manual impregnation methods are not typically used in aerospace applications where the combination of high strength and light weight is critical.

In order to avoid the above problems, it has been common practice to form a prefabricated lay-up (prepreg) that includes the fiber and resin matrix (resin, curing agents and any additives). The prepreg is made under manufacturing conditions that allow the amount and distribution of resin matrix within the prepreg to be carefully controlled. Once formed, the prepreg may be applied to a mold or other support surface in the same manner as a conventional hand lay-up. In general, prepregs are not used immediately after they are formed. Instead, they usually are stored for use at a later time.

There are a number of characteristics that are desirable in any prepreg. For example, the prepreg must be sufficiently flexible to allow application to the desired mold surface. In addition, the tackiness (or tack) of the prepreg must be such that the prepreg adheres to underlying prepreg layers in the mold while not being so sticky that it becomes disrupted when handled. The prepreg resin should remain stable during storage so that the handling characteristics (i.e. flexibility and tack) do not change. In addition, the resin should not flow away from the fibers or otherwise redistribute itself during storage. At the same time, the resin should have appropriate flow characteristics during cure to reduce porosity and provide good laminate quality.

Prepreg materials that utilize bismaleimide resins are prone to storage stability problems and loss of the tack necessary for prepreg handling and lay up of complex structures. In addition, upon cure, bismaleimide resin prepregs often suffer from excessive matrix flow. These flow problems are particularly troublesome when the prepreg is used in making a panel structure where prepreg face sheets are bonded to a honeycomb core. Accordingly, there is a continuing need to develop prepreg systems that provide all of the advantages of a toughened bismaleimide resin while at the same time providing the tack, flexibility, resin flow and storage characteristics that are required for a prepreg to be acceptable for use in making aerospace structures.

SUMMARY OF THE INVENTION

In accordance with the present invention prepreg composite materials are provided that include a fiber layer and a prepreg resin composed of a bismaleimide resin component, a thermoplastic toughening agent and a resin distribution stabilizer. The bismaleimide component is an amorphous mixture of at least three different bismaleimide monomers and a co-curing agent. The combination of the amorphous mixture of bismaleimides along with the thermoplastic toughening agent and resin distribution stabilizer provides prepregs that have good tack, flexibility, resin flow and storage characteristics.

The resin distribution stabilizer provides for stabilization of resin in the fiber layer during prepreg storage while at the same time providing flow characteristics during curing that reduce porosity and enhance laminate quality. The combination of good tack, flexibility and flow characteristics provided by prepreg composite materials of the present invention makes them well suited for use as the face sheets in honeycomb sandwich panels where the contact surface area between the face sheet and the edge of the honeycomb is limited.

The present invention covers both the uncured prepreg and the composite material structures that are formed upon curing of the prepreg. The invention also is directed to methods for making composite materials using the stabilized prepreg and to methods for making honeycomb sandwich panels utilizing the stabilized prepregs.

The above described and many other features and attendant advantages of the present invention will become better understood by reference to the following detailed description when taken in conjunction with the accompanying drawings.

DETAILED DESCRIPTION OF THE INVENTION

Prepreg composite materials in accordance with the present invention include a fiber layer and a prepreg resin composed of a bismaleimide resin component, a thermoplastic toughening agent and a resin distribution stabilizer. The bismaleimide component is an amorphous mixture of at least three different bismaleimide monomers and a co-curing agent. It is preferred, although not necessary, that the amorphous mixture of bismaleimides be a eutectic mixture. The prepreg composite material may be used in any situation where a bismaleimde resin prepreg is required. However, the prepreg is especially well suited for use in panel construction where a honeycomb core is sandwiched between two sheets of composite material. Such honeycomb panels are widely used in aerospace structures for both structural and non-structural applications.

Figure 1:
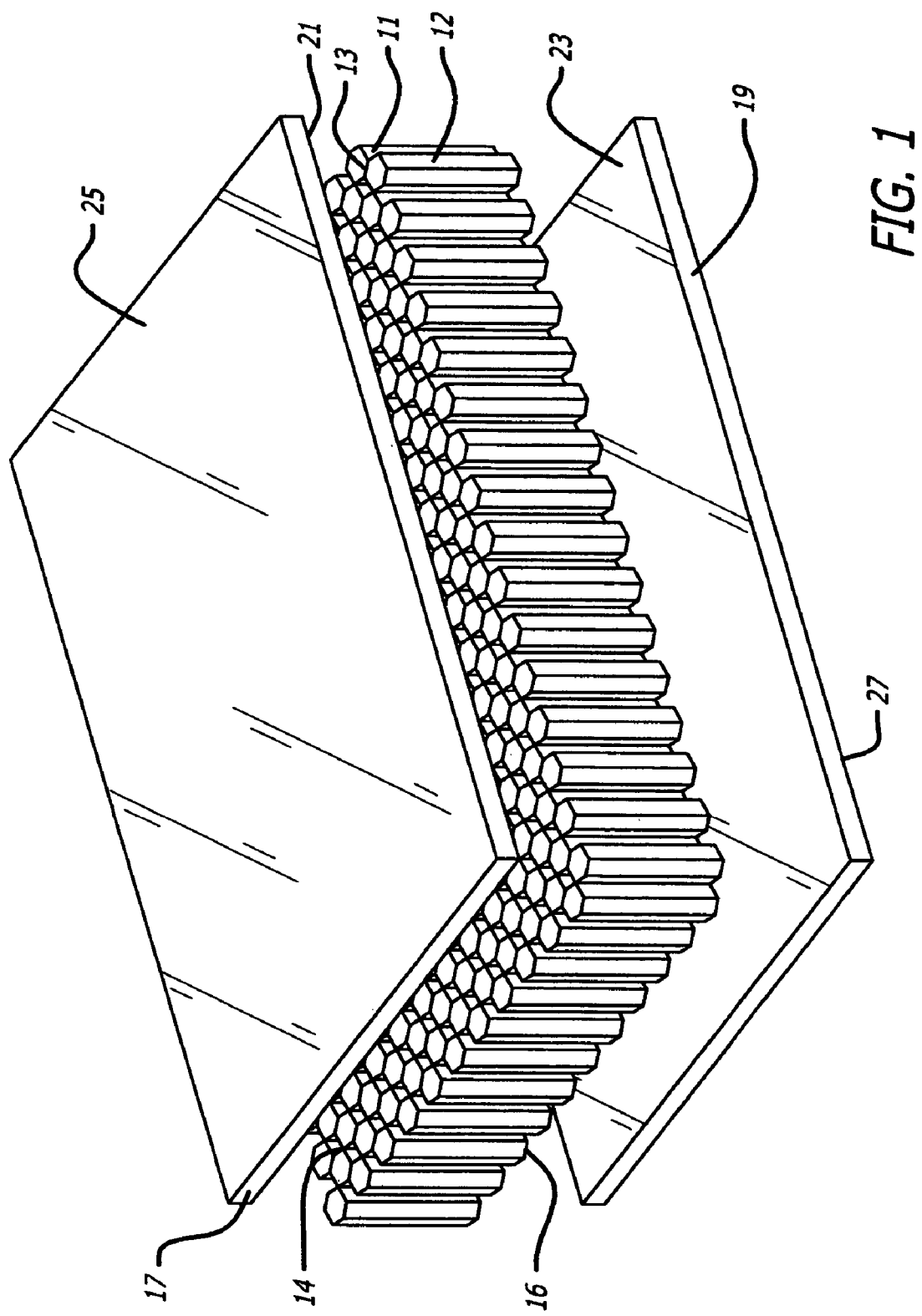
FIG. 1 is a perspective view of a honeycomb core and two exemplary prepreg face sheets in accordance with the present invention prior to bonding of the prepreg face sheets to the core and curing to form a panel.
Figure 2:
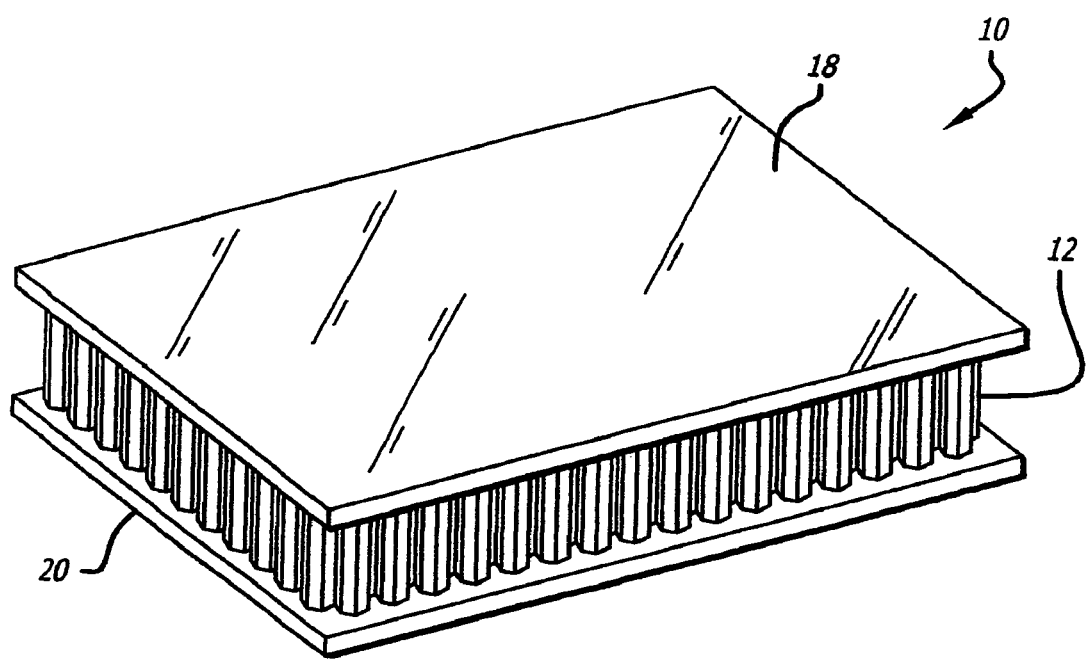
FIG. 2 is a perspective view of an exemplary panel where the prepreg face sheets and honeycomb core shown in FIG. 1 have been bonded together and cured to form the final honeycomb sandwich panel.

The three main components of an exemplary honeycomb sandwich panel for use in aerospace applications are shown in FIG. 1 prior to formation of the panel. The components include a honeycomb core 12 that has walls 11 which form a plurality of honeycomb cells 13. The walls have edges that form the faces or edges of the honeycomb as shown at 14 and 16. The other two components are the prepreg face sheets 17 and 19 in accordance with the present invention. The prepreg face sheets 17 and 19 include interior surfaces 21 and 23, respectively, for bonding to the honeycomb edges. The prepreg face sheets 17 and 19 also include exterior surfaces 25 and 27, respectively. The uncured prepreg face sheets or skins 17 and 19 are applied to the faces of the honeycomb and then cured to form face sheets 18 and 20 of the finished panel 10 as shown in FIG. 2.

If desired, an adhesive may be applied to the prepreg face sheets and/or honeycomb edges to promote adhesion. Suitable adhesives include polyimide, bismaleimide or epoxy film adhesives. If desired, the face sheets may be cured prior to application to the honeycomb. In these situations, the use of an adhesive is required. It is preferred that the prepreg resin be in an uncured or partially cured state prior to bonding to the honeycomb. The use of uncured face sheets is preferred because it combines curing and bonding of the face sheet to the honeycomb into a single step and allows the uncured prepreg resin and adhesive, if any, to interact with the honeycomb edge during the bonding process.

The honeycomb core 12 can be made from any of the materials that are used to form honeycomb that is used in combination with composite face sheets that utilize bismaleimide resins. Exemplary honeycomb materials include aluminum, aramid, carbon or glass fiber composite materials, resin impregnated papers and the like. Exemplary preferred honeycomb materials are aramid-based substrates, such as those marketed under the trade name NOMEX® which are available from E.I. DuPont de Nemours & Company (Wilmington, Del.). Honeycomb cores made from NOMEX® are available commercially from Hexcel Corporation (Dublin, Calif.). Preferred exemplary NOMEX® honeycomb include HRH®10 which is available from Hexcel Corporation. Another preferred honeycomb material is KEVLAR®. Preferred exemplary KEVLAR® honeycomb is available from Hexcel Corporation under the trade name HRH®36. Honeycomb made from carbon or glass composites are also preferred and typically include carbon or glass fabric and a phenolic and/or polyimide matrix. The honeycomb is typically supplied in a cured form and requires no further treatment prior to bonding to the prepreg face sheets.

The dimensions of the honeycomb can be varied widely. For aerospace use, the honeycomb cores will typically have ⅛ to ½ inch (3.2-12.7 mm) cells (i.e., in the expanded direction) with the cores being ¼ inch (6.4 mm) to 2 inches (50.8 mm) thick (distance between the honeycomb edges). The combination of cell size, wall thickness and density of the material that is used determines the weight of the core, which is expressed in pounds per cubic foot (pcf). Composite honeycomb having weights on the order of 2 pcf to 8 pcf are preferred.

Exemplary prepreg face sheets in accordance with the present invention include one or more layers of fibers and a prepreg resin made up of a bismaleimide resin component, thermoplastic toughening agent and resin stabilization agent. The fibers that are used in the prepreg face sheets can be any of the fiber materials that are used to form composite laminates. Exemplary fiber materials include glass, aramid, carbon, ceramic and hybrids thereof. The fibers may be woven, unidirectional or in the form of random fiber mat. Woven carbon fibers are preferred, such as plain, harness satin, twill and basket weave styles that have areal weights from 80-600 gsm, but more preferably from 190-300 gsm. The carbon fibers can have from 3,000-40,000 filaments per tow, but more preferably 3,000-12,000 filaments per tow. Similar styles of glass fabric may also be used with the most common being 7781 at 303 gsm and 120 at 107 gsm. When unidirectional constructions are used, typical ply-weights are 150 gsm for carbon and 250 gsm for glass.

The prepreg resin in accordance with the present invention includes a bismaleimide resin component, thermoplastic toughening agent and a resin stabilizer. The bismaleimide resin component is made up of a combination of at least three bismaleimide monomers and a co-curing agent. The bismaleimide resin combination is preferably, but not necessarily, a eutectic mixture. A eutectic mixture is one where the melting point of the mixture is at a minimum and less than the melting point of the individual bismaleimide resins. There may be several different bismaleimide monomers in the eutectic mixture. It is preferred that the number of bismaleimide monomers be 3. The bismaleimide monomer combinations are selected to provide prepreg resin that is amorphous. "Amorphous" means that the bismaleimide resin component is less than 5 percent crystalline. It is preferred that the bismaleimide resin component be at least 97 percent amorphous (i.e. no more than 3 percent crystalline). Even more preferred are mixtures that are at least 99 percent amorphous (i.e. no more than 1 percent crystalline). The degree of crystallization of the resin is determined by routine measurements, such as differential scanning calorimetry, which are well known in the art.

Any of the known bismaleimide resins can be used to form the amorphous mixtures in accordance with the present invention. Bismaleimides are typically prepared by reacting maleic anhydride or substituted maleic anhydrides with aromatic and/or aliphatic diamines. Exemplary bismaleimides are as follows: N,N'-4,4'-diphenylmethane-bis-maleimide; N,N'-2,4-toluene-bis-maleimide; N,N'-2,6-toluene-bis-maleimide; N,N'-2,2,4-trimethylhexane-bis-maleimide; N,N'-ethylene-bis-maleimide; N,N'-ethylene-bis(2-methyl)maleimide; N,N'-trimethylene-bis-maleimide; N,N'-tetramethylene-bis-maleimide; N,N'-hexamethylene-bis-maleimide; N,N'-1,4-cyclohexylene-bis-maleimide; N,N'-meta-phenylene-bis-maleimide; N,N'-para-phenylene-bismaleimide; N,N'-4,4'-3,3'-dichloro-diphenylmethane-bis-maleimide; N,N'-4,4'-diphenyl-ether-bis-maleimide; N,N'-4,4'-diphenylsulfone-bis-maleimide; N,N'-4.4'-dicyclohexylmethane-bis-maleimide; N,N'-α,α'-4.4'-dimethylenecyclohexane-bis-maleimide; N,N'-meta-xylene-bis-maleimide; N,N'-para-xylene-bis-maleimide; N, N'-4,4'-diphenyl-cyclohexane-bis-maleimide; N,N'-meta-phenylene-bis-tetrahydrophthalimide; N,N'-4,4'-diphenylmethane bis-citraconimide; N,N'-4,4'2,2-diphenylpropane-bis-maleimide; N,N'-4,4-1,1-diphenyl-propane-bis-maleimide; N,N'-4,4'-triphenylmethane-bis-maleimide; N,N'-α,α'-1,3-dipropylene-5,5-dimethyl-hydantoin-bis-maleimide; N,N'-4,4'-(1,1,1-triphenyl ethane)-bis-maleimide; N,N'-3,5-triazole-1,2,4-bis-maleimide; N,N'-4,4'-diphenylmethane-bis-itaconimide; N,N'-para-phenylene-bis-itconimide; N,N'-4,4'-diphenylmethane-bis dimethyl-maleimide; N,N'-4,4'-2,2-diphenylpropane-bis-dimethyl-maleimide; N,N'-hexamethylene-bis-dimethyl-maleimide; N,N'-4,4'-(diphenyl ether)-bis-dimethyl-maleimide; N,N'-4,4'-diphenylsulphone-bis-dimethylmaleimide; N,N'-(oxydi-para-phenylene)-bis-maleimide; N,N'-(oxydi-para-phenylene)-bis-(2-methylmaleimide); N,N'-(methylene di-para-phenylene)-bis-maleimide; N,N'-(methylene di-para-phenylene)-bis-(2-methylmaleimide); N,N'(methylene di-para-phenylene)-bis-(2-phenylmaleimide); N,N'-(sulfonyl di-para-phenylene)-bis-maleimide; N,N'-(thio di-para-phenylene)-bis-maleimide; N,N'-(dithio di-para-phenylene)-bis-maleimide; N,N'-(sulfonyl di-meta-phenylene)-bis-maleimdide; N,N'-(ortho,para-isopropylidene diphenylene)-bis-maleimide; N,N'-(isopropylidene di-para-phenylene)-bis-maleimide; N,N'-(ortho,para-cyclohexylidene diphenylene)-bis-maleimide; N,N'-(cyclohexylidene di-para-phenylene)-bis-maleimide; N,N'-(ethylene di-para-phenylene)-bis-maleimide; N,N'-(4,4"-para-triphenylene)-bis-maleimide; N,N'-(para-phenylenedioxy-di-para-phenylene)-bis-maleimide; N,N'-(methylene di-para-phenylene)-bis-(2,3-dichloromaleimide); and N,N'-(oxy-di-para-phenylene)-bis-(2-chloromaleimide).

The specific combination of three or more bismaleimides that is used to make the bismaleimide resin component may be varied widely provided that an amorphous, and preferably eutectic, mixture is provided that, once the co-curing agent, thermoplastic toughening agent and resin distribution stabilizer have been added, has the necessary flexibility, tack and curing properties required for use as a prepreg resin. As a minimum, the bismaleimide resin component must include a first bismaleimde, second bismaleimide and third bismaleimide that are mixed in proportions to provide an amorphous mixture. Exemplary first bismaleimides include: N,N'-4,4'-diphenyl-bis-maleimide; and N,N'-4,4'-diphenyl-ether-bis-maleimide. Exemplary second bismaleimides include: N,N'-2,4-toluene-bis-maleimide; N,N'-2,6-toluene-bis-maleimide; and N,N'-meta-phenylene-bis-maleimide. Exemplary third bismaleimides include: N,N'-2,2,4-trimethylhexane-bis-maleimide; and N,N'-4,4'-diphenyl-ether-bis-maleimide. Preferred combinations of first, second and third bismaleimides are: 1) N,N'-4,4'-diphenyl-bis-maleimide/N,N'-2,4-toluene-bis-maleimide or N,N'-2,6-toluene-bis-maleimide/N,N'-2,2,4-trimethylhexane-bis-maleimide. The amounts of each resin may be varied. It is preferred that the relative amounts of the bismaleimide resins in the amorphous mixture be between about 40 to 60 weight percent for the first bismaleimide monomer and between about 20 to 40 weight percent and about 10 to 20 weight percent, respectively, for the second and third bismaleimide monomers.

Substantially amorphous eutectic mixtures of three or more bismaleimides are available commercially. For example, COMPIMIDE® 353 is a mixture of N,N'-4,4'-diphenylmethane-bis-maleimide, N,N'-2,4-toluene-bis-maleimide and N,N'-2,2,4-trimethylhexane-bis-maleimide that is available from Degussa/Technochemie (Dossenheim, Germany). COMPIMIDE® 353 is a preferred eutectic mixture of bismaleimide monomers.

The co-curing agent may be any of the comonomers typically combined with bismaleimides. Exemplary co-curing agents include diamines, polyamines and alkenyl aromatic compounds, such as alkenylphenols and alkenylphenoxyethers. Preferred co-curing agents are alkenylphenols, such as the allyl, methallyl and propenyl phenols. Specific examples include o,o'-diallylbisphenol A, eugenol, eugenol methylether and similar compounds, as disclosed in U.S. Pat. No. 4,100,140. Particularly preferred co-curing agents are o,o'-diallylbisphenol A and o,o'-dipropenylbisphenol A. TM124 is a commercially available co-curing agent that is available from Degussa/Technochemie (Dossenheim, Germany), which contains o,o'-diallylbisphenol A.

The thermoplastic toughening agent may be any of the thermoplastic polyimide particles as described in U.S. Pat. Nos. 5,248,711 and 5,120,823. The particles are formed by the reaction between a dianhydride and a diamine. The particles should have sizes in the range of 2 microns to 100 microns. Particle sizes of about 10 to 20 microns are preferred. The particles are formed by crushing or grinding of the polyimide material under cryogenic conditions. The particles may also be formed by suspension precipitation. All or part of the thermoplastic particles may be pre-dissolved in the matrix, if desired.

Exemplary toughening agents that are commercially available include MATRIMID®5218, which is available from Ciba-Geigy (city, state or country) and High Performance Powder P84, which is available from Lenzing A. G. (Lenzing, Austria). MATRIMID®5218 is a polyimide of benzophenone tetracarboxylic dianhydride (BTDA) and 5(6)-amino-1-(4'-aminophenyl)-1,3,3-trimethylindane polyimide. It is ground to provide particle sizes in the desired range. P84 powder is made in accordance with the teachings of U.S. Pat. No. 4,001,186. P84 powder is a polyimide of BTDA and toluenediamine and 4,4'-diaminodiphenylmethane. Other exemplary thermoplastic toughening agents include polyetherimides, such as ULTEM 1000 and EXUM 035, which are both available from General Electric (Pittsfield, Mass.). P84 powder is a preferred thermoplastic toughening agent. The thermoplastic toughening agent is added in amounts that provide the desired degree of toughening for the prepreg resin consistent with performance requirements for each application The resin distribution stabilizer is a high molecular weight elastomer that has a molecular weight of between about 150,000 and 5,000,000 Daltons and is soluble in the resin mixture. Exemplary resin distribution stabilizers include polyethylene oxide, polybutadiene/polyacrylonitrile copolymer elastomers and the like. Polyethylene oxide having a molecular weight of about 2,000,000 Daltons is preferred. The resin distribution stabilizer is preferably in the form of particles that can be mixed with the thermoplastic toughening agent and then added to the bismaleimide component. Alternatively, the resin distribution stabilizer may be mixed directly with the bismaleimide component prior to addition of the thermoplastic toughening agent. Particle sizes of the resin distribution stabilizer should be less than about 100 microns. The amount of resin distribution stabilizer is chosen to be sufficiently low that it does not adversely affect properties of the prepreg, such as tack and flexibility, which are required for prepreg use. On the other hand the amount of distribution stabilizer is chosen to be sufficiently high to prevent undesirable flow of the prepreg resin during storage, while at the same time providing adequate flow properties during curing of the prepreg to reduce imperfections in the laminate or panel facesheet.

The prepreg resin may include varying amounts of bismaleimide component, thermoplastic toughening agent and resin distribution stabilizer provided that the desired properties of flexibility, tack, resin stabilization during storage and proper flow during curing are obtained. The amount of bismaleimide component in the prepreg resin may range from about 85 to 95 weight percent with about 90 weight percent being preferred. The thermoplastic toughening agent should be present in amounts ranging from 5 to 30 weight percent with amount ranging from 7 to 11 weight percent being preferred. Particularly preferred are amounts of about 9 weight percent. The resin distribution stabilizer should be present in amounts ranging form about 0.5 to 5 weight percent of the total prepreg resin with amounts of about 0.7 to 2.0 weight percent being preferred. Particularly preferred are amounts of about 1.0 weight percent of the resin distribution stabilizer.

With respect to the bismaleimide component, the amorphous mixture of bismaleimides should be present in amounts ranging from about 40 weight percent to 80 weight percent. The co-curing agent should be present in amounts ranging from about 20 to 50 weight percent of the bismaleimide component. Preferably, the bismaleimide component contains about 60 to 70 weight percent of bismaleimide mixture and from 30 to 40 weight percent co-curing agent. More preferably, the bismaleimide component contains about 65 weight percent of the eutectic bismaleimide mixture and 35 weight percent of the co-curing agent.

Various diluents and additives may be included in the prepreg resin, if desired. Exemplary diluents include triallylisocyanurate, N-vinylpyrrolidone and diallyether bisphenol A. Exemplary additives include peroxide or azo catalysts, or substituted organophosphine salts.

Hydroquinone is preferably added as an inhibitor in amounts up to about 0.5 weight percent of the total prepreg resin. Other inhibitor's, such as catechol may be used in place of hydroquinone. It is preferred that the amount of hydroquinone be about 0.1 weight percent.

The prepreg resin in accordance with the present invention is prepared and used in the same manner as other toughened bismaleimide prepreg resins. Typically, the mixture of bismaleimide monomer and co-curing agent are combined with the resin distribution stabilizer and heated to temperatures on the order of 200° F. to 250° F. for a sufficient time to dissolve all of the ingredients. Any additives, such as hydroquinone are included in the initial mixture of bismaleimides/resin distribution stabilizer and co-curing agent. The particles of thermoplastic toughening agent are then added incrementally to the dissolved mixture of bismaleimide/resin distribution stabilizer and co-curing agent that has been cooled to a temperature of around 170° F. to 200° F. The mixture is gradually heated back up to around 210° F. as the particles are gradually added. After addition of the final increment of thermoplastic toughening agent particles, the mixture is then cooled to room temperature and may be stored (preferably at temperatures below 10° F.) or used immediately to form a prepreg in accordance with well know prepreg fabrication procedures.

Prepreg made using carbon fabric impregnated with prepreg resin in accordance with the present invention can be stored at temperatures of 10° F. and below for 6 months or more without losing tack or flexibility and while still maintaining desired levels of resin distribution in the carbon fabric. In addition, the prepreg resin continues to exhibit resin flow characteristics during cure which produces void-free laminates that are especially well suited for use as face sheets for honeycomb sandwich panels as described above.

The prepregs made using the prepreg resin of the present invention are cured in the same manner using the same curing systems as other thermoplastic toughened bismaleimide resins. Typically, laminates and other structures incorporating the prepreg are cured by gradually raising the temperature from ambient to a curing temperature of around 375° F. The structure is held at cure temperature for a sufficient time (on the order of a few hours) to insure complete cure. A vacuum may be applied to the structure during curing as is well known in the art. The prepreg may also be cured in an autoclave under pressure as is also well known in the art. In addition, it is preferred that the structure be post-cured in accordance with procedures that are also well known in the art. Post-curing is accomplished after the vacuum/autoclave pressure has been removed and generally is conducted at temperatures of around 450° F. Post-cure times are typically on the order of 16 hours or more.

Examples of practice are as follows:

EXAMPLE 1

A 300 grams of prepreg resin in accordance with the present invention was made using the following ingredients: A) 58.4 weight percent COMPIMIDE®353 as the eutectic bismaleimide mixture; B) 31.5 weight percent TM124 as the co-curing agent; C) 0.1 weight percent hydroquinone; D) 1.0 weight percent polyethylene oxide (molecular weight 2,000,000 Daltons; less than 80 mesh) as the resin flow stabilizer; and E) 9.0 weight percent P84 (425 mesh) as the thermoplastic toughening agent.

Ingredients A, B, C and D were mixed in a kettle and heated to 200° F. A vacuum was then applied and the mixture heated to 225° F. for 10 minutes until all four ingredients were dissolved and then cooled to 180° F. Ingredient E was then added in 6 increments to the A/B/C/D mixture as it was heated to 190° F. This final mixture was held at 180° F. to 190° F. (under vacuum) for 15 minutes. The mixture was cooled to ambient temperature to provide the final prepreg resin.

EXAMPLE 2

The prepreg resin made according to Example 1 was used to impregnate the following carbon fibers: A) IM7G 12K carbon tape available from HEXCEL CORPORATION (Dublin, Calif.), which has a fiber areal weight of 145 gsm; and B) T300 3K PW plain weave carbon fabric available from HEXCEL CORPORATION (Dublin, Calif.), which has a fiber areal weight of 194 gsm. The carbon tape prepreg had a resin content of 33 weight percent. The carbon fabric prepreg had a resin content of 40 weight percent. The prepregs had good tack and flexibility. The prepreg resin remained stable and did not flow away from the fibers or otherwise redistribute itself during short-term storage (up to 10 days) at ambient conditions and long-term storage at 32° F. Multiple layers both types of prepregs where placed together to form uncured laminate structures. The laminate structures were cured under 85 psi autoclave pressure at temperatures on the order 375° F. for about 4 hours to produce cured laminates. These laminates were subsequently post cured, free standing in an oven for 16 hours at 450° F. The prepreg resin exhibited flow characteristics during curing that produced substantially void-free laminates in which the cured resin was evenly distributed through out the laminate structure.

EXAMPLE 3

Woven fabric prepregs made according to Example 2 are bonded to a HRH®36 honeycomb core to form a sandwich panel in the same manner as shown in FIGS. 1 and 2. The prepregs have two plies of plain weave fabric and an areal weight of 193 gsm. The uncured prepreg is applied to each edge of the honeycomb using a bismaleimide adhesive and cured under the same conditions as Example 2, except that the autoclave pressure is about 45 psi. The panels that are formed using the above procedure have face sheets that are void-free and securely bonded to the core.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A prepreg composite material comprising:
   1) a fiber layer; and
   2) a prepreg resin comprising:
      A) a eutectic bismaleimide resin component comprising:
         a) a first bismaleimide monomer selected from the group consisting of N,N'-4,4'-diphenylmethane-bis-maleimide and N,N'-4,4'-diphenyl-ether-bis-maleimide;
         b) a second bismaleimide monomer selected from the group consisting of N,N'-2,4-toluene-bis-maleimide, N,N'-2,6-toluene-bis-maleimide and N,N'-meta-phenylene-bis-maleimide; and
         c) a third bismaleimide monomer selected from the group consisting of N,N'-2,2,4-trimethylhexane-bis-maleimide and N,N'-4,4'-diphenyl-ether-bis-maleimide; and
         d) a comonomer selected from the group consisting of diamines, polyamines and alkenyl aromatic compounds;
      B) a thermoplastic toughening agent consisting essentially of polyimide; and
      C) a resin distribution stabilizer consisting essentially of polyethylene oxide having a molecular weight of between about 150,000 and about 5,000,000 Daltons, said resin distribution stabilizer being present in a sufficient amount to prevent said prepreg resin from flowing away from said fiber layer during storage of said prepreg composite material.

2. A prepreg composite material according to claim 1 wherein said first bismaleimide monomer is 4,4'-diphenyl-methane-bis-maleimide, said second bismaleimide monomer is N,N'-2,4-toluene-bis-maleimide or N,N'-2,6-toluene-bis-maleimide and said third bismaleimide monomer is N,N'-2,2,4-trimethylhexane-bis-maleimide.

3. A prepreg composite material according to claim 1 wherein said first bismaleimide monomer is 4,4'-diphenyl-methane-bis-maleimide, said second bismaleimide monomer is N,N'-2,4-toluene-bis-maleimide, said third bismaleimide monomer is N,N'-2,2,4-trimethylhexane-bis-maleimide and said comonomer is o,o'-diallybisphenol A.

4. A prepreg composite material according to claim 3 wherein said polyethylene oxide has a molecular weight of about 2,000,000 Daltons.

5. A prepreg composite material according to claim 4 wherein said prepreg resin comprises:
   about 90 weight percent of said bismaleimide resin component;
   about 9 weight percent of said thermoplastic toughening agent; and
   about 1 weight percent of said resin distribution stabilizer.

6. A composite material comprising a prepreg according to claim 5 that has been cured.

7. A prepreg composite material according to claim 5 wherein said fiber layer comprises carbon fibers.

8. A prepreg composite material according to claim 3 wherein said prepreg resin comprises:
   about 90 weight percent of said bismaleimide resin component;
   about 9 weight percent of said thermoplastic toughening agent; and
   about 1 weight percent of said resin distribution stabilizer.

9. A composite material comprising a prepreg according to claim 8 that has been cured.

10. A prepreg composite material according to claim 8 wherein said fiber layer comprises carbon fibers.

11. A prepreg composite material according to claim 1 wherein said comonomer is a bis(alkenylphenol).

12. A prepreg composite material according to claim 11 wherein said bis(alkenylphenol) is selected from the group consisting of o,o'-diallylbisphenol A and o,o'-dipropenyl-bisphenol A.

13. A prepreg composite material according to claim 1 wherein said polyethylene oxide has a molecular weight of about 2,000,000 Daltons.

14. A prepreg composite material according to claim 1 wherein said prepreg resin comprises:
   about 90 weight percent of said bismaleimide resin component;
   about 9 weight percent of said thermoplastic toughening agent; and
   about 1 weight percent of said resin distribution stabilizer.

15. A composite material comprising a prepreg according to claim 14 that has been cured.

16. A prepreg composite material according to claim 14 wherein said fiber layer comprises carbon fibers.

17. A prepreg composite material according to claim 1 wherein said fiber layer comprises carbon fibers.

18. A composite material comprising a prepreg according to claim 1 that has been cured.

* * * * *